US005079698A

United States Patent [19]
Grenier et al.

[11] Patent Number: 5,079,698
[45] Date of Patent: Jan. 7, 1992

[54] TRANSILLUMINATION METHOD APPARATUS FOR THE DIAGNOSIS OF BREAST TUMORS AND OTHER BREAST LESIONS BY NORMALIZATION OF AN ELECTRONIC IMAGE OF THE BREAST

[75] Inventors: Leonard E. Grenier, Whiterock; Brian V. Funt; Paul H. Orth, both of Vancouver; Donald M. F. McIntosh, Edmonton, all of Canada

[73] Assignee: Advanced Light Imaging Technologies Ltd., Vancouver, Canada

[21] Appl. No.: 346,853

[22] Filed: May 3, 1989

[51] Int. Cl.$^5$ .............................................. G06F 15/42
[52] U.S. Cl. ................................ 364/413.13; 382/6; 395/132
[58] Field of Search ...................... 364/413.13, 413.16, 364/413.17, 518, 521; 382/6, 50, 54

[56] References Cited

U.S. PATENT DOCUMENTS

| | | | |
|---|---|---|---|
| 4,286,602 | 9/1981 | Guy | 128/665 |
| 4,312,357 | 1/1982 | Anderson et al. | 128/664 |
| 4,407,290 | 10/1983 | Wilber | 128/633 |
| 4,420,742 | 12/1983 | Tadauchi et al. | 340/347 |
| 4,467,812 | 8/1984 | Stoller | 128/664 |
| 4,495,949 | 1/1986 | Stoller | 128/664 |
| 4,515,165 | 5/1986 | Carroll | 128/664 |
| 4,566,125 | 1/1986 | Clunn | 382/48 |
| 4,570,638 | 2/1986 | Stoddart et al. | 128/665 |
| 4,600,011 | 7/1986 | Watmough | 128/660 |
| 4,616,657 | 10/1986 | Stoller | 128/664 |
| 4,618,937 | 10/1986 | Elias et al. | 382/6 |
| 4,761,819 | 8/1988 | Denison et al. | 382/6 |
| 4,856,528 | 8/1989 | Yang et al. | 382/6 |
| 4,907,156 | 3/1990 | Doi et al. | 382/6 |
| 4,947,323 | 8/1990 | Smith | 382/6 |

OTHER PUBLICATIONS

Angquist, K. et al., "Diaphanoscopy and Diaphanography for Breast Cancer in Clinical Practice", Acta Chir. Scand., 147,231, 1981.
Bartrum, R., Jr. and H. Crow, "Transillumination Light Scanning to Diagnose Breast Cancer: A Feasibility Study", AJR, 142, 1984.
Brown, R. et al., "Breast Transillumination as a Diagnostic Procedure: Does It Work?", Abstract 305, St. Boniface Hosp. & Manitoba Cancer Foundation, Univ. Manitoba, 1984.
Bundred, N. et al., "Preliminary Results Using Computerized Telediaphanography For Investigating Breast Disease", Brit. J. Hosp. Med., 70, 1987.
Carlsen, E. N., "Transillumination Light Scanning (Diaphanography)" in *A Multimodality Approach to Breast Imaging*, S. Porrath, Aspen Pub., Inc. 1986.
Carlsen, E. N., "Transmission Spectroscopy: An Improvement in Light Scanning", RNN Images, 13, 22, 1983.
Cutler, M., "Transillumination as an Aid in the Diagnosis of Breast Lesions", Surg. Gynecol. Obster., 48, 721, 1929.
Drexler, B. et al., "Diaphanography in the Diagnosis of Breast Cancer", Radiology, 157, 41, 1985.
Girolama, R. F., and H. P. Leis, Jr., "Diaphanography: A Fourth Dimension in the Diagnosis of Breast Disease?", Breast, 8, 16, 1982.
Greene, F. L. et al., "Mammography, Sonomammography and Diaphanography (Light-Scanning)", The American Surgeon, 51, 58, 1958.
Gros, C. M. et al., "Diaphanologic Mammaire", J. Radiol. Electrol. Med. Nucl., 53, 297, 1972.
Hardy, J. D. and C. Muschenheim, "The Radiation of Heat from the Human Body. IV The Emission, Reflection and Transmission of Infra-red Radiation by the Human Skin", J. Clin. Invest. 13, 817, 1934.
Holliday, H. W. and R. W. Blamey, "Breast Transillumination Using the Sinus Diaphanograph", Brit. Med. Journal (Clin. Res.), 283, 411, 1981.
Hussey, J. et al., "Diaphanography-A Comparison With Mammography and Thermography", Brit. J. Radiol., 54, 163, 1981.
Isard, H. J., "Breast Disease and Correlation of Images: Mammography-Thermography-Diaphanography", Biomedical Thermology, 321-328, 1982.
Lafrenier, R. et al., "Infrared Light Scanning of the Breast", The American Surgeon, 52, 123, 1986.
Mallard, J., "The Noes Have It! Do They?", Silvanus Thompson Memorial Lecture, British Journal of Radiology, 54, 831, 1981.

Marshall, V. et al., "Diaphanography as a Means of Detecting Breast Cancer", Radiology, 150, 339, 1984.
McIntosh, D. M. F., "Breast Light Scanning: A Real-Time Breast-Imaging Modality", Journal of the Canadian Association of Radiologists, 34, 288, 1983.
Merritt, C. et al., "Real Time Transillumination Light Scanning of the Breast", Radiol. Graphics, 4, 989, 1984.
Morton, R. and S. Miller, "Infrared Transillumination Using Photography and Television (Videoscopy)", J. Audiovisual Media. Med., 4, 86, 1981.
Ohlsson, B. et al., "Diaphanography: A Method for Evaluation of the Female Breast", World Journal of Surgery, 4, 701, 1980.
Wallberg, H. et al., "Investigation with Diaphanography, Mammography and Cytological Examination for Diagnosing Breast Cancer", Report Huddinge Hospital, Sweden, 1978.
Watmough, D. J., "A Light Torch for the Transillumination of Female Breast Tissues", British Journal of Radiology, 142, 1982.
Watmough, D. J., "Diaphanography: Mechanism Responsible for the Images", Acta Radiologica Oncology, 21, 11, 1982.
Watmough, D. J., "Transillumination of Breast Tissues: Factors Governing Optimal Imaging of Lesions", Radiology, 147, 89, 1983.
D'Orsi, Carl J. et al., "Lightscanning of the Breast", Breast Cancer Detection: Mammography and Other Methods in Breast Imaging, 2nd Ed., pp. 169–177 (1987).

*Primary Examiner*—Gail O. Hayes

[57] ABSTRACT

A method and apparatus for enhancing the contrast of a local area of interest within an electronic image of an object, such as a female breast, which has been transilluminated by non-ionizing radiation such as light or sound. The area of interest may be a cancerous tumor, cyst or another object which differentially absorbs or transmits the radiation. Enhancement of contrast is by normalization of the electronic image. Normalization includes modeling the illumination field of the image to compensate for the non-uniformity of the illumination field, and then combining the modeled field with the original image. Four normalization processes are disclosed: Gaussian curve fitting, geometric mean smoothing, arithmetic mean smoothing, and arithmetic mean smoothing only within the boundary of the local area of interest. Also disclosed is a process for highlighting local areas which are the result of enhanced transmission of the radiation, such as potential cyst sites, and color mapping more than one displayed image. The normalized image may be displayed for analysis.

44 Claims, 6 Drawing Sheets

TRANSILLUMINATION METHOD APPARATUS FOR THE DIAGNOSIS OF BREAST TUMORS AND OTHER BREAST LESIONS BY NORMALIZATION OF AN ELECTRONIC IMAGE OF THE BREAST

CROSS REFERENCE TO RELATED APPLICATIONS

This application relates to subject matter described in Canadian Application No. 539,503-8 filed June 12, 1987 and in U.S. patent application No. 07/150,335 now abandoned filed Jan. 29, 1988 by Advanced Light Imaging Limited Partnership, and invented by Leonard E. Grenier; Brian V. Funt; and Paul H. Orth, this application being a continuation-in-part of said Canadian and U.S. patent applications.

BACKGROUND OF THE INVENTION

I. Field of the Invention

This invention relates to a method and apparatus for enhancing images of transilluminated materials wherein the area within the image containing the information of interest is the result of differential absorption of the transmittal energy and/or exhibits low contrast. This invention also relates to a transillumination method and apparatus for the diagnosis of breast tumors and other breast lesions using nonionizing radiation energy such as light or sound. More particularly, this invention relates to a method and apparatus for digitally enhancing localized areas of interest in the resulting image of a breast to aid in the diagnosis of malignant tumors, cysts and other lesions. As used herein, transillumination is intended to cover the transmission of both light and sound through an object or material at the appropriate wavelength transmission range (window). Although light and sound are the known non-ionizing forms of radiation, the image enhancement processes described herein may be applicable to electronic images resulting from other forms of transillumination.

II. Description of the Prior Art

Transillumination of the breast with light to assist in the detection and diagnosis of malignant tumors is known. Generally, the technique involves passing light in approximately the 600-1000 nanometer wavelength range through the breast, and directly examining the breast or a recorded image of the breast for the presence of lesions. The lesion may be observed because the human breast comprises fat, fibrous tissue and blood vessels. Cancerous lesions of interest are filled with and surrounded by blood which strongly absorbs light in the selected wavelength range. Moreover, such lesions absorb the light more strongly than the breast's blood vessels. Thus, malignant tumors may be detected because they are more optically dense than the remainder of the breast tissue.

A major advantage of using light is the avoidance of ionizing radiation such as X-rays. This advantage is also applicable to other forms of nonionizing radiation energy such as ultrasound. Although not as useful in imaging cancerous breast lesions, ultrasound does generate images of some lesions such as cysts as a result of differential absorption, and therefore the present invention is applicable to those images.

Optical and electro-optical apparatus have been developed to aid in using the transillumination technique. These apparatus have incorporated improvements in the light source, photographic imaging and the use of television cameras and monitors. Moreover, television cameras have been coupled with analog and digital image enhancement processes to aid the medical practitioner in identifying lesions of interest, particularly cancerous tumors.

Notwithstanding the substantial interest in the transillumination of non-ionizing electromagnetic radiation for diagnosis of breast lesions, the technique has not met with general acceptance among medical practitioners. Although the specific reasons for the technique's lack of acceptance are many and varied, in general it has not been accepted as a clinically reliable substitute or adjunct to X-ray mammography. The principal problem appears to be the technique's inability to detect lesions unless they are close to the breast surface or there is otherwise a large contrast between the lesion and the remainder of the image.

Transillumination of the female breast for diagnostic purposes was proposed at least as long ago as 1928, and reports of the clinical use of a high intensity light source to illuminate the interior of a breast date back to 1929. The procedure was abandoned because it had only a limited ability to distinguish benign and malignant tumors.

The procedure was resurrected in the 1970s when a water cooled high intensity light source to improve illumination was combined with a photographic camera which recorded black and white and infrared images. The apparatus proved to be bulky and the actual examination required long exposure times in a completely dark examination room.

Improvements continued. In 1979, a small hand-held device called a "diaphanoscope" was introduced. This unit contained a broad spectrum light source, fiber optics and a fan that air-cooled the system. Images of the illuminated breast were photographically recorded. Reports of clinical use of the diaphanoscope indicate that abnormal breast tissue absorb light differently than normal tissue, and photographs of transilluminated breast were considered to be good but did not add any new or significant data to breast examination that could not be obtained with X-rays or palpation. It was however determined that transillumination effectively illuminated the more dense breasts of younger women.

Subsequently, infrared light detecting cameras and highly sensitive television cameras and monitors were used to obtain a real-time image that the medical practitioner could view during an examination. Images could be stored, compared to the other breast and photographed using a Poloraid or 35 mm camera attached to the monitor.

Still other work involved the use of flash exposure and color photographs taken with infrared sensitive film.

This work was followed by the digitization of breast images, storage and, to a limited degree, processing of the stored information. Also "false color" was incorporated to give enhanced differentiation to the images. Spectrascan, Inc. of South Windsor, Conn., USA offers a commercial embodiment of a breast illumination system incorporating the use of a video camera, digitization of the breast image, algorithmic image reconstruction, amplification, and display in black-and-white on a video monitor. (See U.S. Pat. Nos. 4,467,812 and 4,485,949 which relate to the Spectrascan, Inc. transillumination method and apparatus.)

More recent apparatus have incorporated freeze frame capability to permit a stable image for photography and/or digitization. The apparatus is also provided with the capability to digitally record and retrieve the images.

Approximately 25 clinical studies using a wide range of patient populations, diagnostic imaging techniques and clinical exams have been done. In general, these studies show that electromagnetic transillumination (also referred to as light scanning) has promise as a breast examination system separate from palpation, X-ray mammography and ultrasound. However, the results of the studies do not correlate sufficiently to permit widespread acceptance of light scanning as a diagnostic technique. One study concluded that X-ray mammography is far superior to light scanning. However, another study concluded that infrared light scanning of the breast is effective in the hands of trained personnel and it should be used as an adjunct to routine breast examination or X-ray mammography to increase the detection of breast pathology.

A clinical study comparing transillumination light scanning using a Spectrascan Light Scan Model 10, and screen-film mammography of the breast was made in 1987. The authors of the study concluded that transillumination light scanning is not competitive with X-ray mammography as a screening method for breast cancer detection. Furthermore, they were unable to identify a select subpopulation of women who might benefit from light scanning as an adjunct to X-ray mammography.

A study conducted a year earlier, also involving the Spectrascan Light Scanner, suggested that X-ray mammography was superior for detecting malignancy.

Notwithstanding the foregoing, the clinical studies suggest that light scanning has an adjunctive value; that is, by using X-ray mammography and light scanning side by side, the overall reliability of imaging for breast disease may be improved.

Several important points may be derived from the conclusions of the light scanning clinical studies. These include:

1. Light scanning is effective even though the currently available equipment is not nearly so sophisticated as X-ray and ultrasound equipment.
2. Light scanning is safer than X-ray mammography because there is no ionizing radiation.
3. Light scanning is highly complimentary to X-ray mammography rather than being a competitive imaging system.
4. Light scanning suffers somewhat because medical practitioners are not familiar with light scanning procedures.
5. Light scanning has particular applicability as a screening procedure for women between the ages of 30 and 40 who would otherwise receive a X-ray mammogram every two years and women over the age of 40 who should have a mammogram every year but do not want X-ray exposure. Light scanning has particular value as an adjunctive diagnostic tool for yearly breast examination in women under the age of 30, high risk patients and cancer patients.

Clinical studies aside, particular problems with existing light scanning apparatus include inability to clearly perceive deep lesions and tumors located near the chest wall. Existing apparatus have difficulty in detecting minimal, non-palable tumors and also produce poor results for patients with clinically occult malignancies. Still further, existing light scan apparatus have not been useful in recent biopsy, aspiration, trauma or hemorrhage patients because of the presence of light absorbent hemoglobin. Significant to the invention described herein, prior light scanning apparatus lacks sensitivity in cyst detection relative to ultrasound.

There therefore is a need for a more sensitive process and apparatus for transillumination diagnosis of breast lesions using non-ionizing radiation (e.g. light scanning or sound) to generate a clinically useful image. It is particularly desirable that such process, and the apparatus for carrying out the process, be more sensitive to the detection of occult, non-palpable breast cancer.

SUMMARY OF THE INVENTION

When an electromagnetic wave such as light impinges on biologic tissue, two effects occur: scattering and absorption. In the case of a pressure wave such as ultrasound, the effects are absorption and reflection. Scattering, absorption and reflection attenuate the light or sound. The hemoglobin in blood strongly absorbs light in the red/near infrared region of the electromagnetic spectrum, 650 nM to 950 nM. Thus, blood vessels and malignant tissue, which are filled with and surrounded by blood, absorb such light relative to the other breast tissue; i.e. lobe, ligament, skin, fascia and fatty tissue. This differential absorption results in an observable contrast within an image of the breast. Ultrasound also is differentially absorbed and produces an observable contrast within an image.

However, image clarity does not necessarily result from differential absorption of the transilluminated light. Transillumination is hampered by the scattering that light experiences when passing through the breast. Attenuation due to Rayleigh scattering is one to two orders of magnitude stronger than absorption, primarily due to the fact that skin can be considered to be a nearly perfect light scatterer. The breast transillumination phenomenon is very similar to the transmission of light through a glass of milk.

In practice this means that a light absorbent mass within the breast in effect casts a shadow on the skin; that is, the observed image is the mass' shadow on the skin. As with all shadows, there is a problem of marginal definition; the closer the object to the surface, the sharper the margins of the shadow. As the object casting the shadow moves farther from the surface, the margins become less distinct; i.e., the wider the shadow's penumbra. This loss of marginal definition may be called "shadowing".

Shadowing has particular effect in the detection of breast tumors using transillumination of light. It explains why deep seated tumors are difficult to detect while those closer to the skin surface are more readily observable. The shadows of a small deep seated tumor may be so diffuse as to be nearly or entirely undetectable by the human eye. Light scanning technique takes different views of the breast to decrease its thickness, thereby bringing the shadowing objects closer to the skin surface to minimize the penumbra effect. But at best this is only a partial solution to the problem of providing an image in which the contrast between the lesion of interest and the remainder of the image is sufficient to be useful to the medical practitioner.

The fact remains that the shadowing effect in transillumination obscures the detection of many malignant tumors.

The present invention overcomes shadowing and other problems inherent in using transillumination to detect breast lesions. As already noted, lesions of interest will differentially absorb light. The problem lies in providing an image of the breast lesion which can be detected by a medical practitioner. More particularly, the present invention provides a method and apparatus for enhancing localized areas in the image of a breast to make them more readily observable by the medical practitioner, and therefore make transillumination more useful in the detection of lesions such as malignant tumors and cysts.

In accordance with the present invention, a breast is transilluminated with light in 650 nM to 950 nM wavelength region. The light traversing the breast is detected by a video camera, and a video signal is generated. The video signal is digitized and processed by normalization routines to provide an image which enhances the local areas representing light absorptive masses within the breast.

A video signal may also be created by use of ultrasound (usually 3 to 10 MHz) according to accepted techniques and practices for such instruments. In accordance with the present invention, the resulting video signal is digitized and processed to provide an image with enhanced local areas representative of differential absorption within the breast.

The image under consideration is made up of two components namely (1) a light (or sound) field component (illumination) and (2) an absorption component. The field component is non-uniform primarily because the light or sound source is effectively a point source. The absorption component is made more difficult to observe because shadowing erodes the margins and reduces contrast. Processing the image using normalization routines according to the present invention accentuates areas of the image representing areas of locally high absorption within the breast.

In different terms, the field component has been determined to have a low spatial frequency, whereas the absorption component has a much higher spatial frequency. The normalization routines of the present invention reduce or remove the effect of the low spatial frequency field to enhance the image's local area of interest which is due to absorption or another causitive effect resulting in higher spatial frequency.

Normalization of the image is accomplished by approximating, smoothing or averaging (i.e. modeling the field) the field component, and then enhancing the contrast by taking the ratio of the original field intensity to the modeled field or otherwise subtracting it out.

As used herein, the term "normalization" is intended to refer generally to the four image enhancement processes which are part of this invention. As such, it is to be distinguished from other uses of "normalization" (or "normalizing") as may appear in the prior art.

Four different normalization routines compensate for different kinds of images. Gaussian curve fitting is used for general purpose enhancement of a wide range of image quality. Geometric mean smoothing is used for low contrast images with poorly differentiated breast outlines and backgrounds which include a lot of detail. Arithmetic mean smoothing is used for either high or low contrast images with poorly differentiated breast outlines or with distinct detail in the background of the image. Normalization by arithmetic mean smoothing with boundary detection is used for high contrast images with well differentiated breast outlines, and dark background containing little or no distinct detail.

In addition to image enhancement by normalization as described herein, the present invention provides a process for highlighting regions in the breast image which are potential cyst sites. More particularly, the cyst process or routine highlights areas within an image normalized by anyone of the normalization routines herein described, as regions of increased intensity due to the fact that cysts are fluid filled, not solid as are cancerous tumors.

Finally, the present invention provides for color mapping more than one image at a time.

Although the primary purpose of the present invention is to provide enhanced images for the diagnosis of breast tumors and other breast lesions, the normalization of the image has other applications, particularly where the localized image area containing the information of interest is the result of differential absorption (or transmission) of the transilluminating electromagnetic or sound energy or exhibits low contrast. For example, the method and apparatus of the present invention may be useful for locating parasites in fish tissue or plastic contaminants in wood pulp.

BRIEF DESCRIPTION OF THE DRAWINGS

The present invention may be embodied in other specific forms without departing from the spirit or essential attributes thereof and, accordingly, reference should be made to the appended claims, rather than to the foregoing specification, as indicating the scope of the invention.

DESCRIPTION OF THE PREFERRED EMBODIMENT

Figure 1:
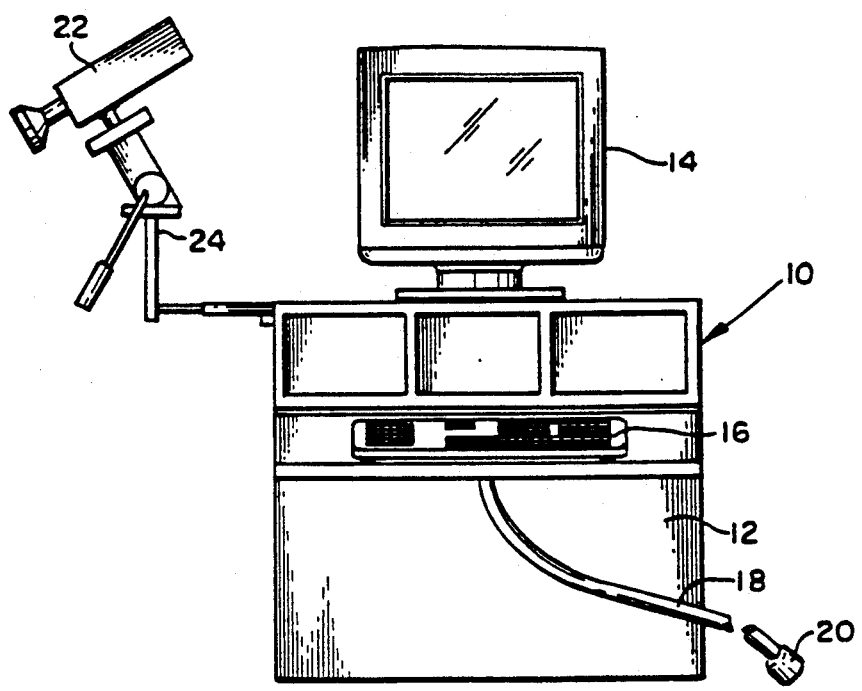
FIG. 1 is a front elevation of the console for the present invention showing the video monitor, keyboard and light source.

With reference to the drawings and in particular to FIG. 1 thereof, there is shown an apparatus 10 for the diagnosis for breast tumors and other breast lesions. Apparatus 10 includes a cabinet 12 for housing the computer and other electronics which are part of the present invention. A video monitor 14 is mounted on the cabinet 12, as is keyboard 16 for the computer used with the present invention. Also shown in FIG. 1 is a fiberoptic bundle 18 extending from a light source (shown in FIG. 2) to hand piece 20. A video camera 22 is mounted on the cabinet 12 by means of a stand 24 with appropriate articulating mechanisms to permit universal adjustment of the camera 22 for bringing it into alignment with a patient's breast. The camera will ordinarily be positioned at various angles above the patient's breast. The flexible fiberoptic bundle is used with the camera to take different views of the patient's breast. These views are standardized, and therefore need not be described herein.

Figure 2:
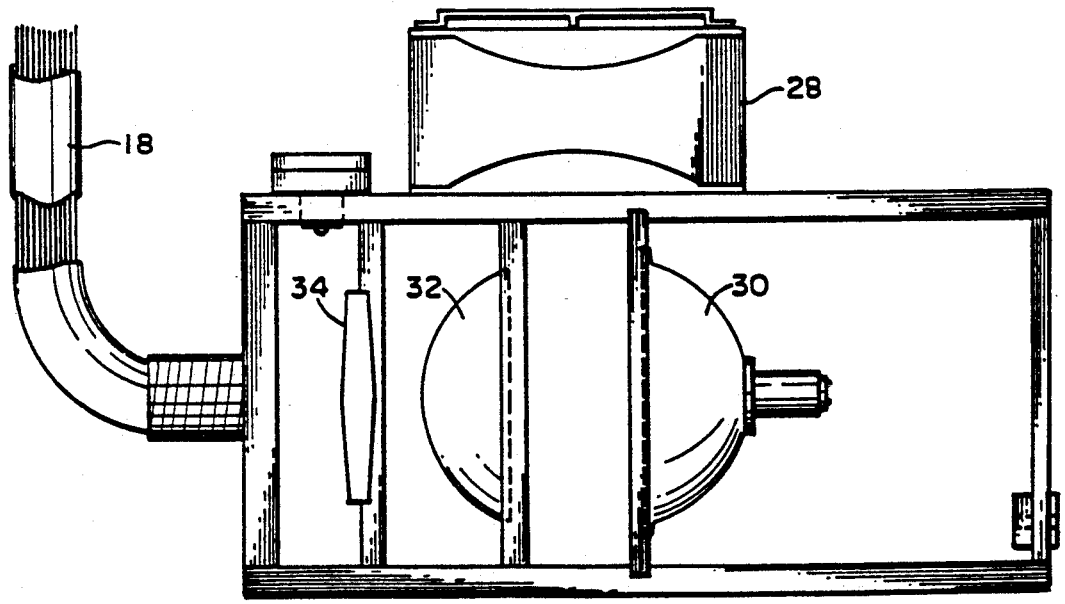
FIG. 2 is a longitudinal sectional view of the light source.

The light source used with the present invention is shown in FIG. 2. Such source includes a housing 26 on which is mounted a cooling fan 28. Within the housing is mounted a 50 watt lamp 30 which may be an Osram Model 41980SP or 41990SP. Mounted in front of the lamp 30 is a lens condenser 32 which may be a Melles Griot Model 01LAG019. Positioned in front of the lens 32 is a filter 34 which may be a Toshiba 25A or Melles Griot 03MCS005.

The lamp 30, lens 32 and filter 34 provide light to the fiberoptic cable 18 in the 650 nM to 950 nM range. The fiberoptic bundle within cable 18 is approximately ⅛ inch in diameter and terminates with the end piece 20. The intensity of the light at the hand piece 20 is approximately 1.2 to 1.5 watts.

In a preferred embodiment of the present invention, the video camera 22 is a charge coupled device (CCD) which is sensitive to light in the preferred wavelength range, namely 650 nM to 950 nM. Moreover, the camera provides an image which can be set up in a desired pixel array as hereinafter described. One such camera which meets the requirements of the present invention is a Photon CCD Model P45310 monochrome camera available from EEV Solid State Devices of Rexdale, Ontario, Canada M9V 3Y6. The EEV Model P45410 may also be used with the present invention.

Figure 3:
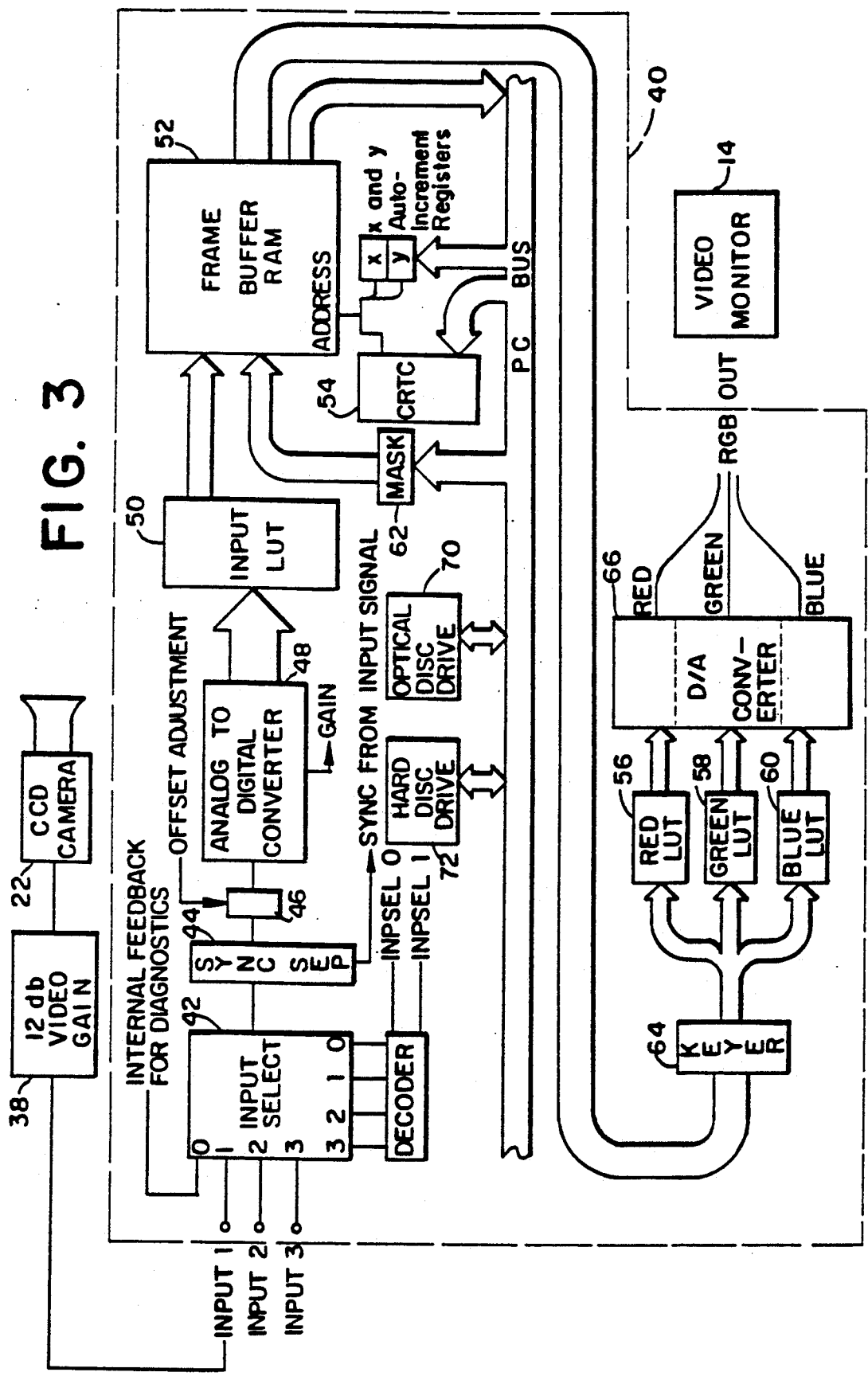
FIG. 3 is a block diagram of the image processing elements of the present invention.

FIG. 3 shows in block form the electronic apparatus used for the present invention.

As shown, the analog video signal from the CCD video camera 22 is amplified by the video gain circuit 38. In the preferred embodiment, video gain circuit 38 provides 12 dB of amplification for the analog video signal.

The amplified video signal is supplied to a video digitizer board 40. The video digitizer board 40 is an electronic device that allows a computer to perform frame grabbing operations on a video signal from an external source. Video digitizers are known, and the particular video digitizer used in conjunction with the present invention is a commercially available device. In particular, the video digitizer board 40 is a PIP-1024b available from Matrox Electronic Systems Ltd. of Dorval, Quebec, Canada H9P 2T4. For a more detailed disclosure of the PIP-1024b video digitizer board, reference should be had to the PIP hardware manual 238MH-00REV.3 dated Sept. 2, 1986 and the user manual 238MU-00REV.2 published by Matrox Electronic Systems Ltd. and available with purchase of the PIP-1024b video digitizer board. This video digitizer board is compatible with the IBM PC, XT and AT computers or other compatible computers. The computer used with the present invention is a Compaq 386 computer.

The PIP-1024b displays the image in an x-y pixel format or array. Each pixel is represented by eight bits, and each pixel can be displayed in a set of gray levels from 0 to 255, with the lower levels representing the darker grays.

As shown in FIG. 3, the video signal is selected in software from one of three input ports on the video digitizer board 40. In this embodiment, the video signal is taken from input 1. The video signal for ultrasound is taken from input 3.

The input signal is passed through a sync signal separator 40, and a DC offset voltage 46 is applied to center any portion of the video signal in the operating range of the analog to digital converter 48. A gain adjustment is also applied to adjust the amplitude of the input signal (i.e. make the picture brighter or darker).

The video input signal is digitized by the analog to digital converter 48 to provide the requisite eight bit number. The eight bit number is sent to the input lookup table 50. The lookup table 50 maps the incoming data to values set up by the user. The input lookup table is loaded from the personal computer. The lookup table maps input data to a gray scale which, for this invention, is a range of gray levels from 0 to 255.

The output of the input lookup table 50 is transferred to a frame buffer RAM 52, which is used to store frame grab data.

A CRT controller (CRTC) 54 has access to the frame buffer, and sends pixel data to the output lookup tables 56, 58 and 60.

The frame buffer 52 is read and write accessible from the computer using x, y coordinates.

Data that are written from the PC bus to the video digitizer pass through a bit mask 62. This mask is set up through software and enables the user to selectively write data from the system to the frame buffer 52. Data are stored in the frame buffer 52 from the input lookup table 50 when frame grabbing is active.

When a frame is grabbed, it is taken from the selected port and digitized. It then passes through the input lookup table 50 and is stored in the frame buffer.

The PIP-1024b has two video modes: one 1024×1024 image or four 512×512 images. Both video formats have a 512×512 pixel display space and can be scanned horizontally and vertically by properly selecting the address in the CRTC 54.

There are two sources of data for output from the video digitizer: the frame buffer 52 and the input lookup table 50. The user can select either video keyer 64, or simply the output from either the frame buffer 52 or the input lookup table 50. This results in both the contents of the frame buffer and the input lookup table being displayed, giving the ability to overlay video onto the input video signal.

The output lookup tables 56, 58 and 60 each received all eight bits of video signal. These tables use one of their stored maps to generate a new value. These values can be used to generate 256 shades of gray or 16.7 million colors. These colors are actually pseudo- or false colors. This means that the colors do not represent what the camera sees but rather represent a level of intensity. The system can assign different colors to gray levels which are very close thereby allowing the observer to distinguish details with much greater ease, and even when the output is grays only.

The output of each of the lookup tables 56, 58 and 60 is sent to a set of digital to analog converters 66 which produce, in real time the three analog signals for the RGB output which may be accepted by the video monitor 14.

The basic functional elements of the video digitizer board 40 have only been briefly described. For a full description of their function and operation, reference should be made to the user's manual for the Matrox PIP-1024 video digitizer board cited above.

Patient data are stored in the optical disc drive 70 and/or the hard disc drive 72. Data and the programs for operation of the system are stored in the hard disc drive 72.

Having described the hardware for accomplishing the purposes of the present invention, the software routines for accomplishing the purposes of the present invention will now be described.

One of the basic principal purposes of the present invention is to normalize the electronic image generated by the apparatus 10. Image normalization has two purposes. One purpose is to compensate for the non-uniform light field produced by the light source. The light source is, of course, the light emanating from the end piece 20 of the fiberoptic bundle 18. This light source is effectively a point source; that is, it has a bright central point with radially decreasing intensity. The present invention compensates for the radially decreasing intensity of this light field.

The second purpose of the invention is to accentuate areas of locally high light absorption within the breast region of the image. As already noted, malignant lesions, as well as blood vessels are characterized by relatively high light absorption because hemoglobin absorbs light in the selected wavelength range. However, because of the shadowing effect, the contrast in the image due to the presence of such lesions or other areas of interest is so subtle as to be effectively indistinguishable to the practitioner. The present invention accentuates these areas within the image to make them more visible.

The invention also accentuates local areas representing sound absorption or reflection.

Although four normalization routines using different algorithms are described herein, they are all based on the following assumptions.

First, it is assumed that the image data is made up of two components—a light field (illumination) component and a light absorption component both of which include spatial frequency variations. For ultrasound the image can be considered to be sound field component and an absorption or reflection component.

Second, it is assumed that the field component and the absorption component are related as follows:

$$E = I \cdot A$$

where

E is energy, and is represented by the light or sound intensity of the image;

I is the light or sound field component; and

A is the absorption component.

In practical terms, the formula states that for any given pixel in the input data image, the gray level of that pixel is a product of an illumination component (I) and an absorption component (A).

The third assumption is that the field component is the dominant information in the breast or other image, but that the absorption component is of most interest in terms of medical diagnosis or otherwise.

The fourth assumption is that the field varies only gradually across the image (i.e. is of low spatial frequency) whereas absorption varies much more rapidly and therefore contains higher spatial frequency information.

The fifth assumption is that an approximation to the absorption component can be recovered from the raw data image by modeling the field component and performing the division $$A = E/I \text{ (Model)}$$

on a pixel by pixel or other basis.

Although applied on a pixel-by-pixel basis as described herein, this invention is not so limited. The normalization and other processes described herein may be applied on a line-by-line, vector or matrix basis.

The normalization process assumes that the field component is of low spatial frequency, whereas the spatial frequency of the absorption component is much higher even though its magnitude in relation to the total field component is small. The invention therefore removes the field component at least in part by approximating or otherwise modeling it, and then subtracting out the modeled field or taking the ratio described above. Thus, the process smooths the field component by identifying the spacial frequency variations and at least partly removing them.

Having described the assumptions upon which the present invention is based, the normalization routines to compensate for the non-uniform field and to accentuate areas of locally high absorption can now be described. The description will focus on an image created by transillumination using light but the principles described are applicable to images resulting from the use of ultrasound.

The first normalization routine can be characterized as normalization by Gaussian curve fitting. This is accomplished as follows.

Initially, the input image is stored in one of the four quadrants of the frame buffer memory 52, which may also be referred to as a frame grabber memory. The frame buffer memory 52 is capable of storing four $512 \times 512$ pixel images, in four different quadrants.

For the purposes of the present invention, the input image from CCD camera 22 is digitized to a $512 \times 480$ pixel format and is stored in one of the four quadrants of the memory 52. As noted above, each pixel is represented by an eight bit number; that is, eight bits or a byte represent the gray level of one pixel in a range of 0–255 with the lower levels being the darker grays.

The image to be normalized is read from memory 52 into the computer memory on a line by line basis. Each of the eight bit numbers is converted to the internal numeric representation of its gray level within the computer.

Normalization of the image as stored in the computer is done line by line. First, each pixel in a line is converted to its logarithm and stored as a sixteen bit integer, hereinafter referred to as a data logpixel. Natural logarithms (base e) are used. Next, a set of regularly spaced data logpixels on each line are used to develop a Gaussian distribution curve determined by the least squares method. Typically, thirty regularly spaced data logpixels on each line are chosen. A standard least square's curve fitting method is used to fit a quadratic equation to these data logpixels. The quadratic equation $y = a_0 + a_1 x + a_2 x^2$ is used. It has three independent parameters, $a_0$, $a_1$ and $a_2$ which are calculated for each line using the aforesaid regularly spaced data logpixels.

The next step in the routine is to normalize the line by taking each curve fitted logpixel, subtracting the data logpixel, and adding a selectable normalization constant to obtain a normalization logpixel. A typical normalization constant usable with the present invention is 128.

The resulting normalized logpixel is next compared to a threshold amount. The threshold amount is typically chosen as antilog [[logpixel] × 12]. If the resulting normalized data logpixel is less than the threshold amount, then that part of the line is normalized to only the threshold amount.

The foregoing is repeated for each line.

Next, using a special lookup table, the antilogarithm for each normalized pixel is calculated. The normalized pixel data is converted from integer representation in the computer to eight bit format and transferred to the frame buffer 52. All lines of the image array of pixels are so normalized until the entire normalized image is now in the frame buffer. The normalized image is then displayed on the video monitor 14.

In more general terms, the foregoing routine creates a model of the illumination field which approximates a Gaussian distribution for each line. The actual video signal is a low level signal whose illumination field is relatively convoluted due to the presence in the image of the edge of the breast, blood vessels, and possibly a tumor. By subtracting out the approximate Gaussian distribution model of the illumination field, variations are smoothed but sharp discontinuities due to the absorption component remain and are enhanced even though they are of low magnitude in relation to the overall light field.

Normalization of the breast image by Gaussian curve fitting is used for general purpose enhancement of a wide range image quality.

Another routine for compensating for the non-uniform light field and accentuating areas of locally high light absorption may be described as geometric mean smoothing. In general, this routine involves comparing an input image pixel with a surrounding local area, and looking for areas of relatively high absorption. More particularly, the routine involves examining a selected optical area surrounding each pixel in the image to look for subtle changes in contrast. The surrounding area has been determined experimentally although in general it depends upon the anticipated the size of the tumors in the breast and changes in intensity in the light field. The surrounding area is averaged to a single value to thereby remove the effect of variations in the light field from the selected area.

The geometric mean smoothing routine is accomplished as follows:

The video image (512×480 pixels) is stored in one of four quadrants of the frame buffer 52. A quarter size sample of the original image (256×240 pixels) is stored in another quadrant and is used as input data for the normalization algorithm.

The normalization algorithm is performed as follows.

A "local average" pixel gray value is calculated for each pixel in the input image, using a horizontal and vertical (2 pass) geometric mean operation. The surrounding area or neighborhood over which this averaging operation is applied is preferably a square whose center is the pixel in question and whose side length is a number of pixels substantially smaller than the video image. As indicated above, the dimensions of the surrounding area are optimized to accentuate highly absorptive lesion-like areas in the breast image. The area (shape and size) has been determined experimentally using images of patients with known pathology and the help of an experienced radiologist. The area is large enough to accentuate the largest expected highly absorptive area (e.g. malignant tumor) yet is small enough so that small highly absorptive areas are not masked by the averaging operation.

For the purposes of the present invention it has been determined that a square whose center is the pixel in question and whose side length is 65 pixels accomplishes the foregoing purposes. Of course, larger or smaller areas may be determined as more experimental data are developed. Also shapes other than a square may be found to be useful.

The 2 pass averaging operation looks at each pixel in a line and takes the average of the pixels on each side of the selected pixel that are within the boundary of the preselected area (e.g. each of 64/2 pixels on both sides of the selected pixel). The procedure is repeated for each column in the pixel array. A weighted average may be used.

In accordance with the routine herein described, the image is normalized by taking the ratio of the input image to the smoothed image, on a pixel by pixel basis. The resulting ratio is then scaled so that the pixel values lie within a preselected range of gray levels of 0-255. Also the values may be stretched over the gray scale range. Stated otherwise, the geometric average for the surrounding area for each pixel is calculated, and then the aforesaid ratio is determined on a pixel by pixel basis.

The geometric mean is taken for the area by averaging the logarithm of each pixel in the local area. The pixel by pixel image ratio may be performed using logarithm and antilogarithm lookup tables.

The execution time for determining the geometric mean for each area surrounding each pixel may be reduced by using scaled logarithms stored in a lookup table and two passes of a one dimensional averaging mask instead of one pass of a two dimensional mask, as well as a moving window averaging algorithm.

The normalized image is transferred from the computer to the frame buffer memory 52 and displayed. In a preferred embodiment, the normalized image is displayed below the sampled original image on the video monitor 14.

Areas of locally high absorption are flagged for the practitioner's attention in the following manner. All pixels in the normalized image represent a ratio of the input image pixel to the smoothed image pixel. Those ratios which are less than a predetermined number are mapped in a lookup table to a dark gray level value. In particular, those whose ratio is less than 1.0 are mapped to a dark gray level value such as 20, and thus are flagged or thresholded.

This thresholded normalized image is then displayed adjacent to the unthresholded normalized image on the video monitor 14. To further enhance the local area of high absorption, a false color may be selected by the operator to further accentuate the threshold of pixels by automatically coloring them. For example, they may be colored red. This is accomplished in a straightforward manner by mapping all such thresholded pixels in a lookup table to the color red.

Normalization of the breast image by geometric mean smoothing is used for low contrast images with poorly differentiated breast outlines and backgrounds which include a lot of detail.

The geometric mean smoothing routine for normalizing the image may be modified by substituting arithmetic mean smoothing for the geometric mean smoothing of the local areas described above. Geometric mean smoothing or averaging takes the ratio of scaled logarithms. Normalization by arithmetic mean smoothing is accomplished by taking the arithmetic average of the surrounding square local areas. Otherwise, normalization by arithmetic mean smoothing is accomplished in the same manner as normalization by geometric mean smoothing.

Arithmetic mean smoothing of the image is used for either high or low contrast images with poorly differentiated breast outlines or with distinct detail in the background of the image.

It is apparent from the foregoing description of normalization by either geometric or arithmetic mean smoothing of local areas, that the averaging technique substantially removes the effect of the light field from the image. The local surrounding area becomes one gray value. The area is chosen so that the area of interest for each pixel is averaged. Each routine is carried out over the entire sample image resulting in the requisite compensation for the non-uniform light field. Taking the ratio accentuates the locally high areas of absorption within the breast region of the image.

A fourth routine to compensate for the non-uniform light field and accentuate areas of locally high light absorption may be referred to as normalization by arithmetic mean smoothing with boundary detection. This normalization procedure is the same as normalization by arithmetic mean smoothing, except the arithmetic mean normalization is performed only within the "breast region" of the image.

An assumption underlying the normalization procedures described herein is that the information contributed to the image by the light field is of low spatial frequency, while that contributed by local areas of light absorption is of high spatial frequency. While this assumption is generally correct, an exception occurs at the boundary of the breast region and the background. At this boundary there is a sharp change in the light intensity. In other words, high spatial frequency information is contributed by the light field. The consequence of high spatial frequency information in the light field is that distortion occurs at the region boundary. This distortion may be eliminated by performing the normalization routine only within the breast region of the image.

Distortion at the breast region boundary is a consequence of the two smoothing normalization procedures used to model the light field; that is to provide an average or smoothed image to model the light field. The first procedure uses a Gaussian fit whereas the latter two provide an average or smoothed image to model the light field. These latter two models do not take into account the sharp change in the light field found at the breast region boundary. The Gaussian fit normalization fails at the edge of the breast image where there is a singularity that does not actually represent the breast. Consequently, these routines introduce some distortion in the normalized image data at this boundary.

This distortion can be avoided by normalizing only over the breast region of the image where the low spatial frequency model of the light field is entirely valid. This is accomplished by determining the "breast region" outline using a region finding algorithm which combines edge detection and boundary fitting.

The routine for determining the breast region outline commences with detecting the edge of the breast region.

First, a sample version of the original image (preferrably 128×120 pixels) is stored in a random access memory buffer.

Next, potential outline edge points are found by making two passes (horizontal and vertical) of a differentiating edge detection mask over the input data; i.e. the data are differentiated to find points of inflection. Each pass of the mask searches for the first occurrence of a positive gradient higher than a constant threshold. For example, the threshold can be fifteen gray levels out of a possible 256. The threshold is set in the mask by padding the mask with a constant number of zeros. In this example, fifteen zeros are used to provide the aforesaid threshold.

The edge detection mask functions as follows. On the horizontal pass each row of the sample version is searched from left to right for the first dark region/light region edge. The same row is then searched from right to left for the first dark region/light region edge. A vertical pass is made in the same fashion. In this way a "left" and a "right" edge point may be found in each row, and a "top" and a "bottom" edge point in each column of the sample version of the original image.

The location of all edge points found in the manner described above are stored in the sample image by storing their coordinates.

These coordinates are used to calculate the center of the edge points. Also, the average distance of each of the edge points from the center of the image is calculated.

The next step in the edge detection routine is to find one edge point which is highly likely to be on the true boundary of the breast region. This point will serve as the starting point for the boundary fitting algorithm described hereinafter. This particular edge point is determined as follows. The set of edge points is searched for the longest "continuous" edge segment; that is the longest cluster of adjacent pixels is considered to be a continuous edge segment. The point on this segment whose distance from the center is closest to the average distance of the edge points from the center is then taken to be the starting point for the boundary fitting algorithm.

Boundary fitting is accomplished as follows. The boundary fitting algorithm finds a closed curve which approximates the breast region boundary. An axis is rotated through the center of the edge points in stepwise fashions. Typically, such steps are 10°. At the initial position, the axis passes through the center and the starting point described above. At each 10° step the input data is searched for an edge point which is on the axis and whose distance from the center is not more than 8 pixels different than the last point found. If such a point is found for a particular step, it is linked to the last point found using a standard line interpolation routine. When the axis has rotated a full 360° the boundary fitting algorithm has drawn a closed curve which is considered the breast region boundary. This boundary is then superimposed onto a quarter sized sample raw image (256×240 pixels), which is used for actual normalization.

Normalization proceeds according to the arithmetic mean normalization described above but only over the region inside the breast region boundary.

The normalization routines heretofore described incorporate techniques for accentuating areas of locally high light absorption within the breast region of the image. Such areas of light absorption are the result of malignant lesions and/or blood vessels which absorb the light passing through the breast. However, not all lesions are due to malignancies. A common form of lesion is the cyst which should be readily distinguishable from malignant lesions in a practical system of diagnosis. Stated otherwise, it is desirable to identify regions on the breast image which are potential cyst sites as opposed to regions representing high light absorption.

Cysts differ significantly from malignant tumors in that they occur as fluid filled pockets and can be felt as spheroidal shaped lumps within the female breast tissue. Due to their shape and constituent structure, cysts act like lenses when the breast is illuminated by light emitted from the fiberoptic bundle 18. The lens like quality of a cyst enhances the transmission of light through the breast. As a result, the digitized breast image will show abnormally bright symmetric circular areas which represent cysts.

It is desirable that the practitioner be able to determine if a breast lump is cystic or solid. To aid in this determination, the present invention provides a routine which flags regions of increased intensity on a normalized breast image. Such regions of increased intensity may be identified as cysts.

For the purpose of describing the cyst routine, it is assumed that the image is first processed and one of the four normalization routines described above has been obtained.

The first stage in processing the normalized breast image for cysts is to apply several passes of a 3 ×3 averaging mask to smooth or "blur" the image. This routine simply averages areas of 3 pixels by 3 pixels over the entire normalized breast image. By way of example, three passes of the averaging mask may be made.

Smoothing or blurring the normalized breast image helps to improve the contours that define the cyst region so that they appear smooth and not jagged. This smoothing step also helps eliminate any high frequency artifacts in the image which could be mistaken as possible cysts.

The next step is to group pixels in the smoothed normalized image above a certain gray value threshold into one of five gray value (bins). This binning process is accomplished using a lookup table as herein explained.

The initial threshold has been determined with the aid of a consulting radiologist after examining numerous patient breast images with known cysts. Only pixels in the image above the threshold gray value are binned. The remainder of the pixels in the image less than the threshold value are left untouched.

The binning process uses a lookup table to modify the smoothed, normalized breast image so that pixels with a gray value:

G1 to G2 are assigned gray value G1
G2+1 to G3 are assigned gray value G2
G3+1 to G4 are assigned gray value G3
G4+1 to G5 are assigned gray value G4
G5+1 to G6 are assigned gray value G5

The gray value G1 is selected as the threshold. All pixels in the image less than gray value G1 are left unmodified.

The next step in the process is to "contour" the potential cyst sites. The purpose of the aforesaid binning is to ease the contour phase of this cyst routine.

The contour phase involves outlining the gray value regions G1 to G5. One line of the binned image is read into computer memory at a time and processed from left to right looking for pixels above the threshold G1. When the first one is found, that pixel is set to a gray value which is chosen to represent the contour line and the pixel gray value is recorded. The routine continues to scan the line to the right examining each pixel looking for a gray value different from the current gray value and above the threshold. The next pixel found that meets these requirements is set to the chosen contour line value and the pixel gray value is recorded. The process is repeated for each line. Because of the binning process described above, the resulting process image displays the various gray value regions G1 to G5 separated from each other by the contour lines. In other words, a contour line is inserted in the image. Because of the requirements for setting the contour lines, the resulting image displays the various gray value regions G1 to G5 separated from each other by the contour lines. These contour regions are then laid over the original normalized breast image.

If desired, a color lookup table can then be used to color each of the gray regions (G1 to G5) different colors, leaving the rest of the image uncolored.

As previously indicated, the video digitizer board 40 provides the capability of adding false color to highlight various features of the breast. This may be referred to as "color mapping". In general, color mapping involves assigning pixel gray values (0 to 255) in the image to various strengths (0 to 255) of the three basic colors (red, green and blue) using the output color lookup tables 56, 58 and 60. Color mapping is known, and it is a feature of the PIP-1024b video digitizer board.

However, at times it is desirable to display up to four normalized or enhanced breast images (256×240 pixels) on the 512×480 pixel resolution video monitor. Moreover, there are times when it is desirable to color map two or more breast images simultaneously to a different color mapping scheme. A further feature of the present invention is to allow simultaneous mapping to different color mapping schemes.

The procedure for mapping two or more images on one screen to different mapping schemes is as follows.

First, consider the case of two images to be displayed on one 512×480 resolution display image plane. Assume that one image (A) is to be colored blue, and the other image (B) red, yet both images use the full gray scale range. The problem is to determine which pixel is to be mapped to which color.

In accordance with the present invention, the pixel values in each image are modified to be distinguishable, each from the other. For the two image display, this is accomplished as follows.

For image A, each pixel is examined, and if the pixel has an odd gray value, it is let alone. If the pixel has an even gray value, then a value of one is added or subtracted from it.

The second image B is similarly processed. Each pixel is examined, and if the pixel has an even gray value, it is let alone. If the pixel has an odd gray value, then a value of 1 is added or subtracted from it.

The changes in the pixels in both images by 1 gray value is so small that the human eye cannot detect the modification.

To complete the process, color mapping tables are created so that when the color lookup table is applied to the whole 512×480 image, image A will appear in one color and image B will appear in another color; e.g. red and blue. The coloring map table is set so that all odd pixel values map to red and all even pixel values map to blue, for example. Since image A contains only odd pixel values after modification, only that image will be colored red. Also, since image B contains all even pixel values, only image B will be colored blue.

The foregoing describes a scheme for segmenting two images. The scheme can be expanded to segment three or four images for simultaneous display images mapped to different color schemes.

For four images, a gray value of 4 is added or subtracted to three of four pixel values in each set of successive four pixel values, while the fourth pixel value is let alone. Thus, in the four image case, after modification, image 1 would contain the pixel values 0, 4, 8, 12, ..., image 2 would contain pixel values 1, 5, 9, 13, ... , etc.

Although mathematically an infinite number of segmented images could be created in this manner, the practical limit is four images because beyond four images the changes in gray values become noticeable.

FIGS. 4a, 4b, 4c and 4d illustrate in block form the functional organization of the software for the present invention. These drawings are, for the most part, self-explanatory.

Figure 4A:
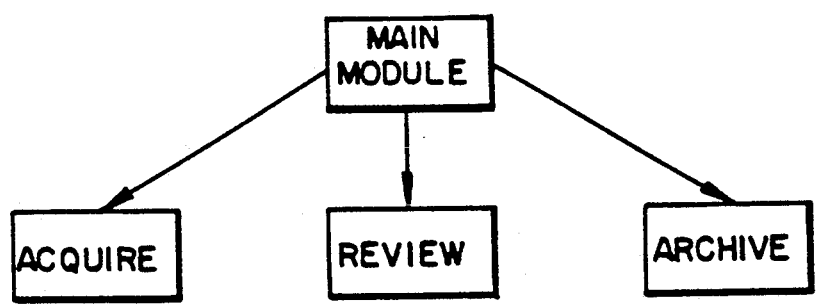
FIGS. 4a, 4b, 4c and 4d are block diagrams showing the functional organization of the system software used for the present invention.

FIG. 4a shows the overall basic organization including the main module which accesses data either by initially acquiring the video image, retrieving it from archival records such as the optical disk drive 70, or for review.

Figure 4B:
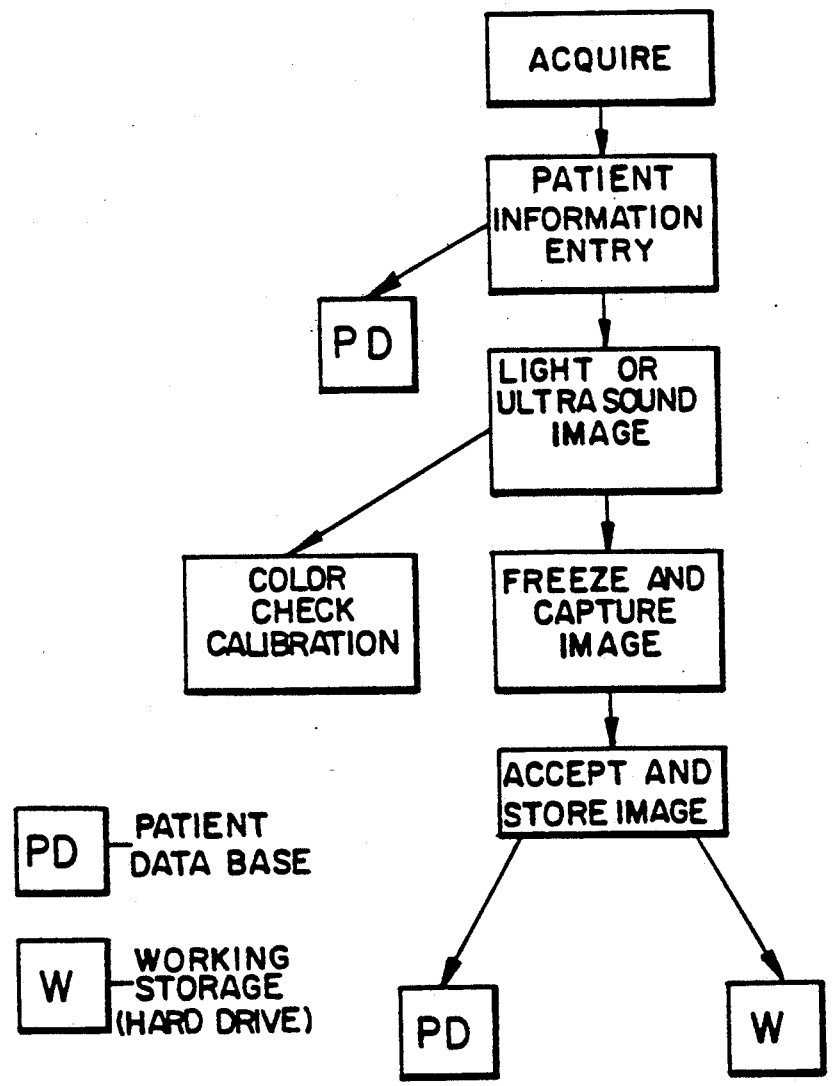

The acquisition mode is illustrated in FIG. 4b. Patient information is acquired by keyboard entry in the computer and stored in the patient data base. Other means of entry such as bar code or magnetic stripe may be used. The image is acquired by video or ultrasound, digitized and entered into the frame buffer 52. It may be color checked or calibrated as desired. The image may be examined in real time, and if acceptable, is stored in the patient data base or in the working storage which for purposes of this invention is a hard disk drive 72. The image may be withdrawn from working storage for examination on the video monitor.

Figure 4C:
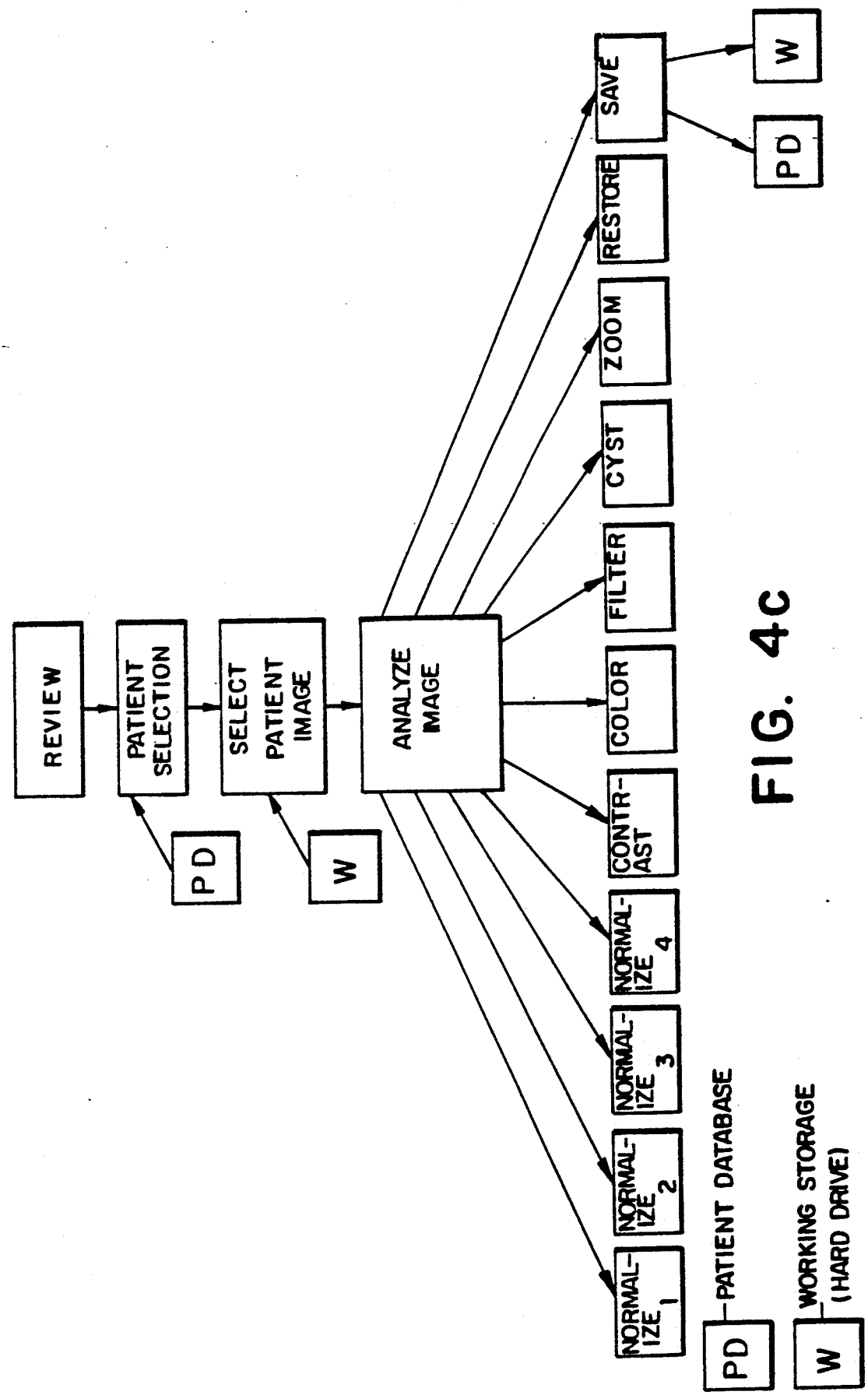

The organization of the program for review is shown in FIG. 4c. The patient information is called up from the patient data base by the patient selection section. Selection of patient information is called up from the working storage unless it is already in the patient data base. Then the image is analyzed.

The original image may be displayed or it may be normalized using any of the four normalization routines described above. The cyst routine may also be used.

In addition, the software system provides for adjusting contrast, filtering, zooming, restoring the image to its original form, and saving the image in either the patient data base or working storage. Since these latter procedures are known and do not form a part of the present invention, they have not been described in detail.

Generally, the addition of color, as indicated above, is a known mapping procedure. However, color segmentation as described may be used if desired.

Figure 4D:
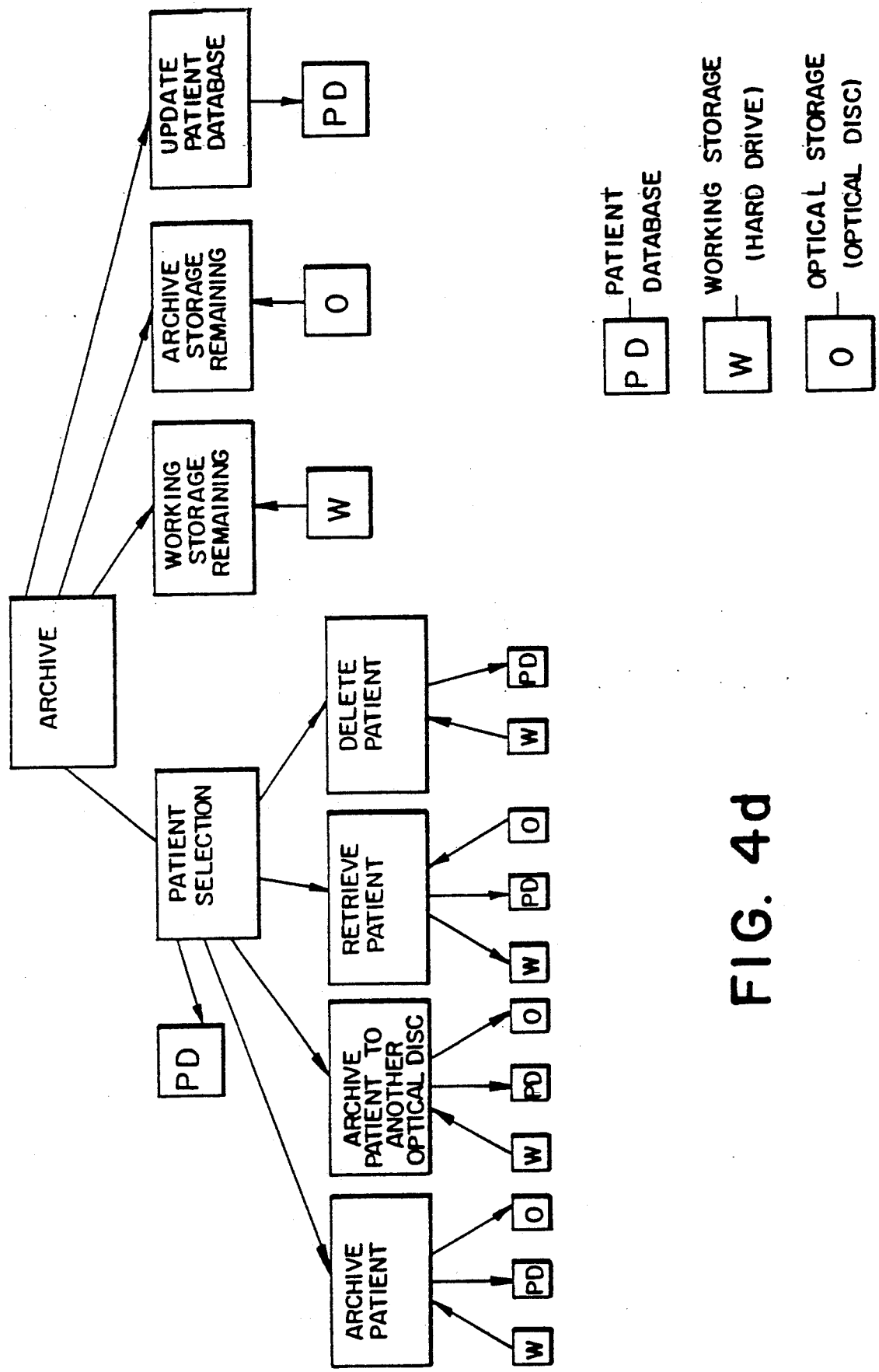

FIG. 4d illustrates the functional organization of the archival software. This figure shows the organizational interrelationship between the patient data base, working storage, optical storage and the manner of acquisition of the information. The drawing is self-explanatory, and therefore does not require duplicative written explanation.

The present invention has been described in conjunction with the use of light energy for transillumination of the female breast. However, the normalization routines described herein may be used to enhance the images created by ultrasound.

Figure 5:
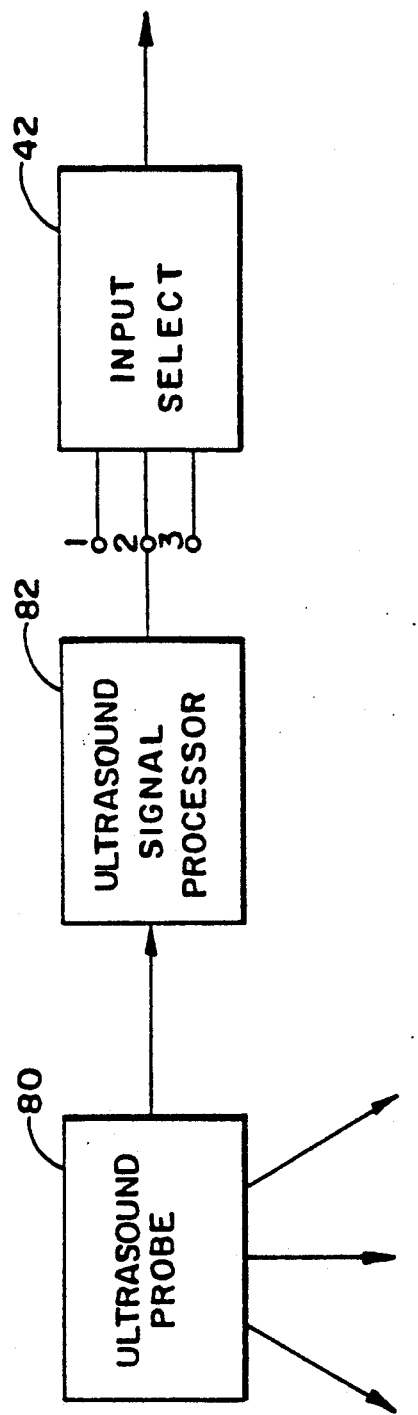
FIG. 5 is a block diagram of an ultrasound source of radiation for use in the present invention.

FIG. 5 illustrates in block form the acquisition of an ultrasound signal for use with the present invention. As shown, an ultrasound probe 80 acquires and transduces the sound signal (e.g. 7.5 mHz) transmitted through the breast. Ultrasound is typically a 3 MHz to 10 MHz pressure wave. The output of probe 80 is provided to an ultrasound signal processor 82 which processes the ultrasound signal to a video signal. By way of example, ultrasound probe 80 may be a Siemens 7.5 MHz linear array, and ultrasound signal processor 82 may be a Siemen's SL1 ultrasound machine.

The signal from ultrasound signal processor 82 is transmitted to the input select 42 of the video digitizer board 40. The signal is inputed through input number 2 select whereas the optical video signal is inputed through input select number 1. The inputed ultrasound signal is thereafter digitized and processed in the manner of the video signal provided by CCD camera 22.

The image generated by use of ultrasound is orthogonal to the image obtained by transillumination using light. As such, the ultrasound image provides an indication of the depth and size of the lesion and will, therefore, provide increased diagnostic capabilities to the medical practitioner. An example of this adjunctive value to ultrasound may be explained in terms of a benign cyst. A benign cyst may initially be diagnosed as a potential malignant tumor by use of the image obtained by transillumination of light if it is blood filled. The ultrasound image, however, will remove doubt if it is benign because of the cyst's low acoustic impedance. The ultrasound image records the reflected and transmitted signal. There is less geometric distortion than results from light imaging. As such, is has value in determining the size and depth of the cyst below the skin.

As previously noted, the present invention is not intended to be a replacement for X-ray mammography. Rather, it is intended to improve upon existing transillumination diagnosis, and to be used as an adjunct to X-ray mammography.

Transillumination, in the red and near infrared regions of the electromagnetic spectrum, is particularly useful for the denser breast of younger women. The procedure allows the practitioner to better distinguish between malignant and benign lesions.

As indicated above, ultrasound also has an adjunctive value.

The advantages of x-ray mammography remain. In particular, the x-ray image of the tumor is less localized; that is, the tumor appears larger than it actually is, thus making it easier for the practitioner to identify its presence. In conjunction with ultrasound, the approximate depth and size of the tumor can be ascertained.

We claim:

1. A method of breast imaging for medical diagnosis of the presence of breast lesions comprising, passing a non-ionizing radiation through the breast in a range of frequencies which are differentially absorbed or transmitted by lesions within the breast, detecting the radiation which has passed through the breast, generating an electronic image of the breast, converting the image so generated into a digital format of pixel brightness values, electronically normalizing the digital image by compensating for the non-uniformity of the radiation field component of the image to enhance the contrast of areas representing locally high differential absorption or transmission of the radiation through the breast, and displaying the normalized image for analysis by a medical practitioner.

2. The method according to claim 1 wherein normalization of the digital image includes:

for each line in the array of pixels within the digital format of the image:

converting the numeric value of each pixel to its logarithm (herein "logpixel"), fitting a gaussian curve to a set of selected, spaced logpixels in the line to generate a set of curve fitted logpixels, subtracting the curve fitted logpixels from the input image logpixels, adding a normalization constant, converting each of the normalization logpixels to its antilog, and generating a digital image made up of each line of normalized pixels for display.

3. The method according to claim 1 wherein normalization includes:

determining an average pixel value within a preselected local area in the neighborhood of each pixel in the digital input image, the dimensions of said local area being optimized to accentuate the areas representing locally high differential absorption or transmission of the radiation in the digital image of the breast, then determining the ratio of each pixel in the input image to the corresponding local average pixel, and scaling the pixel ratio values to allowable gray scale levels for display.

4. The method according to claim 3 wherein the local area average for each pixel is calculated as a geometric mean.

5. The method according to claim 3 wherein the local area average for each pixel is calculated as an arithmetic mean.

6. The method according to claim 3 wherein the optimized local area is a regular polygon.

7. The method according to claim 6 wherein the optimized local area is a square of 65 pixels on a side.

8. The method of claim 3 including reducing distortion at the boundary between the image of the breast and the remainder of the digital image by normalization only within the breast region of the digital image comprising:

detecting the edge of the breast by sampling the occurrence of points of light to dark gradients in the input image, determining the coordinates of the edge points, determining the center of the edge points and the average distance of an edge point from the center, determining a single edge point which is most likely to be a true boundary of the breast region, then generating a closed curve by rotating an axis through a set of edge points located within a predetermined distance range from the center, starting with said single edge point, and then normalizing the image within the region defined by the closed curve.

9. The method of claim 3 including the step of further enhancing areas representing locally high absorption by mapping all pixels whose input image to local average pixel ratio is less than a predetermined value to a dark gray value level.

10. The method of claim 9 including the step of falsely coloring the mapped pixels.

11. The method of claims 2, 3 or 8 including further enhancing the areas representing locally high transmission of the radiation to aide in determining cyst sites, comprising:

taking the average of preselected sets of normalized pixels to smooth the contours that represent the cyst regions, assigning each pixel having a gray scale value above a threshold value to one of a preselected number of gray values, then generating a contour region by selecting a set of pixels in a line of pixels, each of which has both a gray value above the threshold value and a value different from the other pixels, setting each of the selected pixels to a contour line value to generate a contour region, and then overlaying the normalized image with the contour region.

12. The method of claim 11 including the step of coloring the contour region, and leaving the rest of the image uncolored.

13. A method of breast imaging for medical diagnosis of the presence of breast lesions comprising, passing a non-ionizing radiation through the breast in a range of frequencies which are differentially absorbed or transmitted by lesions within the breast, detecting the radiation which has passed through the breast, generating an electronic image of the breast, converting the image so generated into a digital format of pixel brightness values, electronically normalizing the digital image by compensating for the non-uniformity of the radiation field component of the image to enhance the contrast of areas representing locally high differential absorption or transmission of the radiation through the breast, said normalizing step including averaging the gray values representing the electromagnetic radiation field and determining the ratio of the original radiation field to the averaged field, and displaying the normalized image for analysis by a medical practitioner.

14. The method according to claims 1, 2, 3, 8 or 13 wherein the radiation is light having a wavelength in the red to near infrared region of the electromagnetic spectrum.

15. The method according to claim 14 wherein the wavelength of the radiation is 650 nM to 950 nM.

16. The method according to claims 1, 2, 3, 8 or 13 wherein the radiation is ultrasound.

17. The method according to claim 16 wherein the radiation has an ultrasound signal frequency of 7.5 MHz 18. The method according to claims 1, 2, 3, 8 or 13 wherein the radiation is either ultrasound or light in the red to near infrared region of the electromagnetic spectrum.

19. The method according to claim 1, 2, 3, 8 or 13 wherein the normalization is done on a pixel by pixel basis.

20. A method according to claims 1 or 13 wherein normalization includes:

determining an average pixel value within a preselected local area in the neighborhood of each pixel in the digital input image, the dimensions of said local area being optimized to accentuate the areas representing locally high differential absorption or transmission of the electromagnetic radiation in the digital image of the breast, then determining the ration of each pixel in the input image to the corresponding local average.

21. The method according to claim 20 wherein the local area average for each pixel is calculated as a geometric mean.

22. The method according to claim 20 wherein the local area average for each pixel is calculated as an arithmetic mean.

23. The method of claim 20 including reducing distortion at the boundary between the image of the breast and the remainder of the digital image comprising:
determining the boundary of the breast image, and
then normalizing the image within the region defined by said boundary.

24. A method of enhancing the contrast of a local area of interest within an electronic image resulting from passing radiation through an object which differentially absorbs the radiation, comprising:
converting the image into a digital array of pixel gray values,
normalizing the digital image to compensate for the non-uniformity of the radiation field and to enhance the contrast of areas representing locally high differential absorption of the radiation transmitted through the object,
said normalizing step including modeling the illumination field to approximation of the desired field and then combining the original field with the modeled field,
and displaying the normalized image for analysis.

25. The method of claim 24 wherein normalization of the digital image includes:
for each line in the array of pixels within the digital format of the image:
converting the numeric value of each pixel to its logarithm (herein "logpixel"),
fitting a gaussian curve to a set of selected, spaced logpixels in the line to generate a set of curve fitted logpixels,
subtracting the curve fitted logpixels from the input image logpixels,
adding a normalization constant,
converting each of the normalization logpixels to its antilog,
and generating a digital image made up of each line of normalized pixels for display.

26. A method according to claim 24 wherein normalization includes:
determining an average pixel value within a preselected local area in the neighborhood of each pixel in the digital input image, the dimensions of said local area being optimized to accentuate the areas representing locally high differential absorption or transmission of the radiation in the digital image,
then determining the ratio of each pixel in the input image to the corresponding local average pixel,
and scaling the pixel ratio values to allowable gray scale levels for display.

27. The method according to claim 26 wherein the local area average for each pixel is calculated as a geometric mean.

28. The method according to claim 26 wherein the local area average for each pixel is calculated as an arithmetic mean.

29. The method according to claim 26 wherein the optimized local area is a regular polygon.

30. The method of claim 29 including reducing distortion at the boundary between the image of the object and the remainder of the digital image by normalization only within the object region of the digital image comprising:
detecting the edge of the object region by sampling the occurrence of points of light/dark gradients in the input image,
determining the coordinates of the edge points,
determining the center of the edge points and the average distance of an edge point from the center,
determining a single edge point which is most likely to be a true boundary of the object region,
then generating a closed curve by rotating an axis through a set of edge points located within a predetermined distance range from the center, staring with said single edge point,
and then normalizing the image within the region defined by the closed curve.

31. The method of claims 25, 26 or 30 including further enhancing the areas representing locally high transmission comprising:
taking the average of preselected sets of normalized pixels to smooth the contours that represent the cyst regions,
assigning each pixel having a gray scale value above a threshold value to one of a preselected number of gray values,
then generating a contour region by selecting a set of pixels in a line of pixels, each of which has both a gray value above the threshold value and a value different from the other pixels,
setting each of the selected pixels to a contour line value to generate a contour region, and then overlaying the normalized image with the contour region.

32. The method according to claims 1 or 24 wherein normalization of the image includes:
sampling brightness values of pixels within the digital format,
fitting a Gaussian curve to the set of sampled pixel values to generate a set of curve fitted pixel values,
subtracting the curve fitted pixel values from the pixel values of the digital format to generate a normalized image made up of a pixel format resulting from difference in curve fitted values and pixel brightness values of the digital array.

33. The method of claim 26 including reducing distortion at the boundary between the image of the object and the remainder of the digital image comprising:
determining the boundary of the image of the object, and
then normalizing the image of the object within the region defined by said boundary.

34. The method of claim 26 including the step of further enhancing areas representing locally high absorption by mapping all pixels whose input image to local average pixel ratio is less than a predetermined value to a dark gray value level.

35. The method of claim 34 including the step of falsely coloring the mapped pixels.

36. The method according to claim 1, 13 or 24 comprising:
generating two or more normalized images for simultaneous display,
segmenting each image for color mapping of preselected pixel gray values within each image to different mapping schemes,
said segmenting step including adding or subtracting an integer equal to the number of images to be displayed to sets of successive pixel values so that the resulting pixel values within each image are not equal.

37. A method according to claim 24 wherein normalization includes:
    determining an average pixel value within a preselected local area in the neighborhood of each pixel in the digital input image, the dimensions of said local area being optimized to accentuate the areas representing locally high differential absorption or transmission of the radiation in the digital image,
    then determining the ratio of each pixel in the input image to the corresponding local average.

38. Transillumination apparatus for enhancing the contrast of a local area of interest within an electronic image resulting from passing radiation through an object which differentially absorbs the radiation, comprising:
    a source of non-ionizing radiation of a frequency which can be transmitted through the object whose image is to be recorded,
    a detector for detecting the radiation which has passed through the object and transducing it into an electronic signal representative of the image,
    circuit means for converting the signal into a digital format of pixel brightness values,
    means for electronically normalizing the digital image by compensating for the non-uniformity of the radiation field component of the image to enhance the contrast of areas representing locally high differential absorption or transmission of the radiation transmitted through the object,
    said means for normalizing the digital image including modeling the illumination field to an approximation of the desired field and then combining original light field with the modeled field,
    and means for displaying the image.

39. Transillumination apparatus in accordance with claim 38 wherein the means for normalizing the image includes means for sampling the brightness values of pixels within the digital format, fitting a Gaussian curve to the set of sample pixel values to generate a set of curve fitted pixel values, and subtracting the curve fitted pixel values from the pixel values of the digital format to generate a normalized image made up of a pixel format resulting from the difference in the curve fitted values and the pixel brightness values of the digital array.

40. Transillumination apparatus in accordance with claim 38 wherein said normalizing means includes means for determining an average pixel value within a preselected local area in the neighborhood of each pixel in the digital input image, the dimensions of said local area being optimized to accentuate the areas representing locally high differential absorption or transmission of the radiation in the digital image of the object, and means for determining the ratio of the pixel values in the input image to the corresponding local average pixel.

41. Transillumination apparatus in accordance with claim 40 including means for reducing distortion at the boundary between the image of the object and the remainder of the digital image by determining the boundary of the object image and normalizing the image within the region defined by said boundary.

42. Transillumination apparatus in accordance with claims 39 or 40 wherein the radiation is light having a wavelength in the red to near infrared region of the electromagnetic spectrum.

43. Transillumination apparatus in accordance with claims 39 or 40 wherein the radiation is ultrasound.

44. Transillumination apparatus in accordance with claims 39 or 40 including means for enhancing areas representing locally high transmission, said means including means for taking the average of preselected sets of normalized pixels to smooth the contours that represent the areas of locally high transmission, assigning each pixel having a brightness value above a threshold value to one of a preselected number of brightness values, and selecting a set of pixels in a line of pixels, each of which has a brightness value above the threshold value and a value different from the other pixels, and setting each of the selected pixels to a contour line value to generate a contour region, and then overlaying the normalized image with the contour region.

* * * * *